DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 4, 1971

886 O.G. 4

T886,002

PREPARATION OF ORIENTED FOAM LAMINAR STRUCTURES

Leon Edward Wolinski, Buffalo, N.Y., and Roland G. Harris, Chadds Ford, Pa., assignors to E. I. du Pont de Nemours and Company, Wilmington, Del.

Continuation-in-part of application Ser. No. 848,206, Aug. 7, 1969. This application Sept. 26, 1969, Ser. No. 861,467

Int. Cl. C09j *5/00*

U.S. Cl. 156—311

No Drawing. 8 Pages Specification

Process for the preparation of film-foam laminar structures substantially free from warp which comprises maintaining the laminar structure in a flat configuration after lamination while cooling the structure below the distortion temperature of the foam. In a preferred embodiment the foam sheet is an oriented closed cell foam consisting essentially of styrene polymer. The preferred films are of polyvinyl chloride and polypropylene.